Patented Apr. 18, 1939

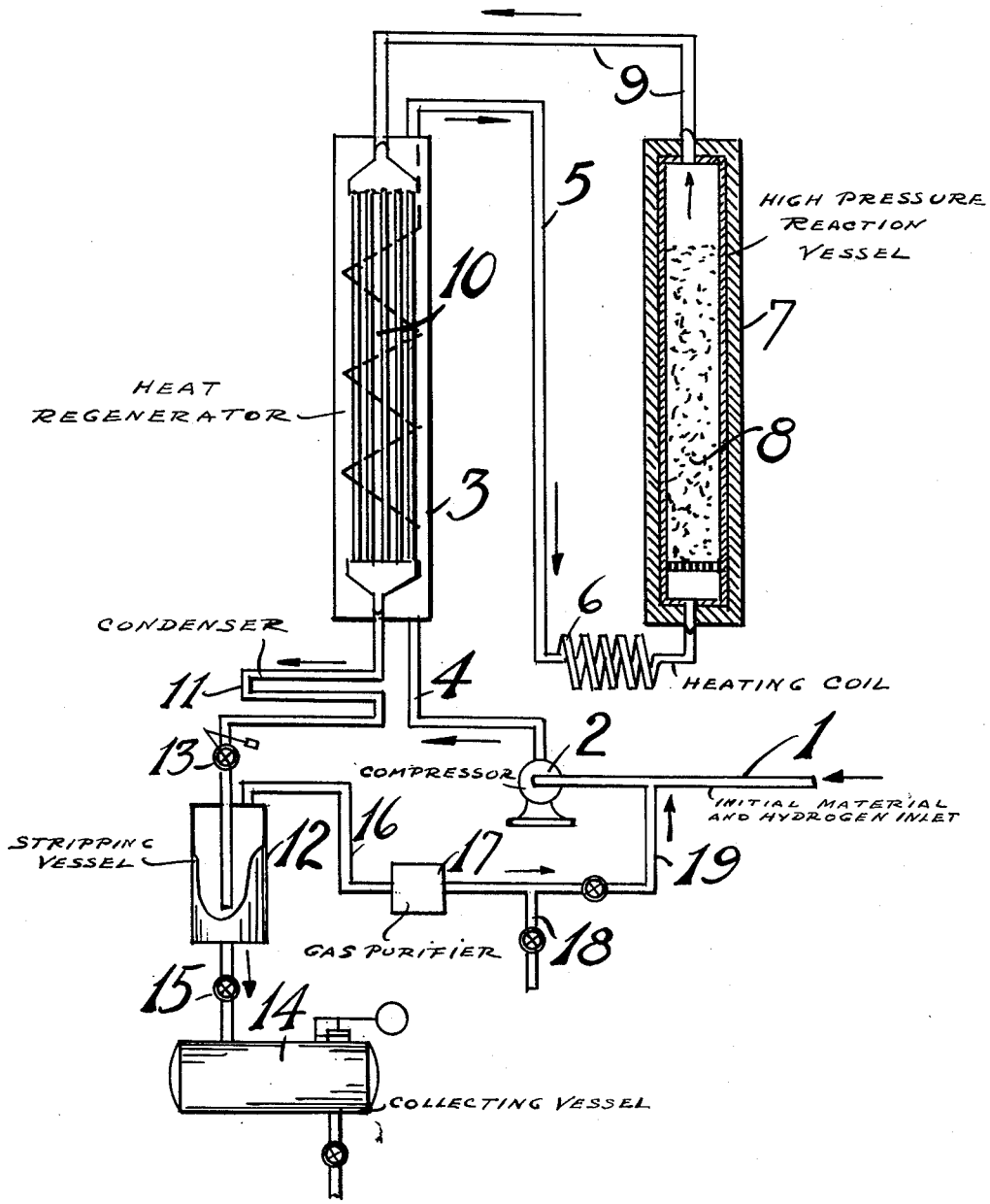

2,154,527

UNITED STATES PATENT OFFICE 2,154,527

CARRYING OUT CATALYTIC REACTIONS

Mathias Pier, Heidelberg, and Walter Simon and Paul Jacob, Ludwigshafen-on-the-Rhine, Germany, assignors to Standard-I. G. Company, Linden, N. J., a corporation of Delaware Application December 28, 1935, Serial No. 56,532
In Germany December 29, 1934

6 Claims. (Cl. 196—53)

The present invention relates to improvements in carrying out catalytic reactions, especially in the thermal conversion of combustible carbonaceous substances, preferably in the treatment with added hydrogenating gases of distillable carbonaceous materials and more particularly to improved catalysts or carriers for catalytic substances for use in said processes. We have found that in carrying out said processes remarkable advantages are obtained by working in contact with catalytic substances or carriers for catalytic substances or both, which consist or consist for a great part of metals, metal compounds or siliceous substances or mixtures of said substances, the activity of which has been increased prior to their application by treatment with fluorine or hydrogen fluoride or other compounds of fluorine having a like action under the conditions of activation, the contact with hydrogen fluoride being made by a method other than chemical precipitation.

Examples of compounds having a like action as fluorine or hydrogen fluoride are hydrogen fluorsilicic acid which is employed above its decomposition temperature and fluorides of ammonium, in particular acid ammonium fluoride. Said compounds frequently exercise their effect by decompositions yielding hydrogen fluoride under the conditions of activation.

Probably the presence of a little moisture is necessary to further the action of fluorine and also possibly of the compounds of fluorine, and if sufficient moisture is not present in the activating system suitable amounts of water or water vapor may be introduced.

The fluorine or hydrogen fluoride may, if desired, be prepared in situ.

The activation treatment by hydrogen fluoride may be carried out in the liquid phase with solutions thereof. As a rule when working in the liquid phase aqueous solutions of hydrogen fluoride are employed, usually of at least 5 per cent strength, say 6 to 15 per cent, for example, 10 per cent. If desired, stronger solutions or weaker solutions of hydrogen fluoride may be employed, the conditions of treatment being modified accordingly to give the desired variation of the surface of the said substances. The materials may be treated in the form of a suspension or paste with said solutions. Pastes containing equal amounts by weight of liquid and solid matter may be employed with advantage. Usually the activation treatment in the liquid phase is carried out at room temperature, but elevated temperatures may be employed if required, for example, when working with weak solutions or when treating substances which are corroded with difficulty.

The treatment in the liquid phase may also be carried out with solutions of acid ammonium fluoride.

The activation may also be carried out in the gas phase with fluorine or hydrogen fluoride or other fluorine compounds having a like action, as a rule at elevated temperature. The temperatures employed for activation in the gas phase will not usually exceed 500° C.

After the activation treatment in accordance with the present invention, particularly when activating carriers, the activated material may be washed, for example with water. The washing treatment is, if necessary, followed by a drying treatment. In case a catalyst substance is to be deposited on an activated carrier, the carrier may be dried after or before said deposition, as required.

The duration of the aforesaid activation treatments depends on the nature of the materials undergoing activation and on the nature of the activating agents employed and their concentration. The duration may be chosen so short that only an etching of the material takes place, but in general the treatment is continued until a loss of weight of a few per cent say 5 per cent up to 10 to 30 per cent of the activated material occurs, if said material is treated in the liquid phase or washed out.

Several of the substances comprising fluorine used in accordance with the present invention may be employed simultaneously.

Other substances such as other halogens, for example chlorine, bromine or iodine or other hydrogen halides or hydrogen sulphide or the like may be present simultaneously in the activation treatment according to the present invention. Sometimes regulated amounts thereof may improve the activation, and usually they do no harm. In cases where impurities have a deleterious effect it is advantageous to remove from the reagent substances present in the activation treatment.

The materials consisting for the most part of compounds of silicon more particularly employed for activation in accordance with the present invention are silicates of materials containing large amounts of silicic acid which can be brought into a surface active or catalytically active or porous state.

Substances of this type of natural occurrence may be activated with particular advantage in accordance with the present invention, if desired, after suitable pretreatment, although artificial substances consisting for the most part of compounds of silicon may also be employed.

Bleaching earths from various sources, fuller's earth, bentonite, diatomaceous earth and other silicates having a large surface or silica gel are employed by preference as materials consisting of or consisting for the most part of compounds of silicon in the present process.

The aforesaid substances may be treated at ordinary or elevated temperature up to 500° C. with fluorine or hydrogen fluoride, for example, in the form of hydrofluoric acid, or other compounds of fluorine. For example, a bleaching earth may be treated with gaseous hydrogen fluoride at about 100° C. for about 3 to 6 hours.

It has been found to be advantageous to subject said materials comprising silicon compounds to a treatment with mineral acids, such as hydrochloric acid, sulphuric acid, nitric acid and the like, usually at elevated temperatures, preferably before, but, if desired, after the treatment with fluorine or hydrogen fluoride or other compounds of fluorine.

It has proved to be particularly advantageous to use materials consisting for the most part of compounds of silicon, and more particularly bleaching earths activated by treatment with fluorine, hydrogen fluoride or like fluorine compounds as components of catalytic materials containing also other catalysts or as carriers for catalyst substances in the said processes, since thereby very inexpensive and yet highly active catalysts are obtained. Said substances consisting for the most part of compounds of silicon may also sometimes be employed as catalysts by themselves.

Said materials containing silicon may after activation in accordance with the present invention be impregnated in known manner with a catalytically acting metal compound, as for example a thio salt, nitrate, phosphate, sulphate, chromate, oxalate, molybdate, tungstate and the like, which is dissolved in an aqueous or organic liquid. Also a metal compound may be precipitated from a solution of a metal salt in the presence of the activated carrier, for example, iron sulphide may be precipitated from solutions of iron sulphate by means of ammonium sulphide, or iron chromate by means of ammonium chromate. The catalyst substance may also be adsorbed from a colloidal solution thereof by means of a carrier pretreated in accordance with the present invention. Where more convenient the catalyst substance may first be deposited on the carrier, and the catalyst thus obtained then activated in accordance with the present invention.

As examples of metals and metal compounds which may be activated by treatment with fluorine or hydrogen fluoride or other compounds of fluorine may be mentioned Zn, Mg, Ti, Zr, V, Cr, Mn, rare earth metals and the metals of the iron group of the periodic system and their compounds, preferably their oxides. Aluminous substances as for instance alumina and especially activated alumina may advantageously serve as catalysts after being treated in the desired manner.

The pretreated metals and metal compounds may be employed as catalysts themselves or as components of catalytic materials containing also other catalysts. The said metal compounds, preferably activated alumina, may also be employed as carriers for catalysts.

The catalyst substance or carrier therefore or catalyst activated by treatment with fluorine, hydrogen fluoride or the like may be subjected to an after-treatment with hydrogen, hydrogen halide or hydrogen sulphide at elevated temperature. For instance, in cases where the improved catalyst activity is reduced by the subsequent washing treatment, for example, with water, it is desirable to subject the washed materials to a treatment to restore said catalyst activity. For example activated materials containing metal sulphides which have been washed may be subjected to treatment at elevated temperature and preferably under pressure with hydrogen sulphide or like sulphidizing agents.

The great advantage obtained with catalysts prepared in accordance with the present invention consists in that very small amounts of a highly catalytically active metal compound supported on a carrier activated by treatment with fluorine, hydrogen fluoride or like corrosive fluorine compounds yields practically the same results as a large amount of the same metal compound and thus a considerable reduction in expenses for the catalyst is attained. Thus, for example, a bleaching earth treated with fluorine and provided with about 10 per cent of tungsten sulphide has the same activity as about ten times the amount of tungsten sulphide by itself. When converting middle oils into benzines by destructive hydrogenation with said catalysts a product with a high octane number is obtained whilst the formation of gaseous hydrocarbons is very low and the present invention is of particular advantage for said treatment. When applying the present catalysts their advantages become particularly apparent when they are stationarily contained in the reaction vessel, and the reagents are passed thereover, but said catalysts may also be employed finely dispersed in the reagents.

With such liquid initial materials as are liable to give rise to the formation of deposits on the catalysts, such as oils poor in hydrogen obtained from solid carbonaceous materials by destructive hydrogenation, low-temperature carbonization, coking or extraction, or distillation products thereof and especially oils containing oxygen as for example, tar fractions containing phenols, it is preferred to first pass the initial material together with hydrogenation gases under pressure at temperature from about 220° to 480° C. over strongly hydrogenating catalysts, in particular heavy metal sulphides, and only then to subject the initial material preferably after separation of any low boiling constituents contained therein to a main treatment with hydrogenating gases, suitably in vapor phase, in the presence of preferably stationarily arranged catalysts, which have been prepared in accordance with the present invention.

For the preliminary treatment with hydrogenating gases in particular the sulphides of the heavy metals of the 4th to 8th groups of the periodic system, as for example, of tungsten, molybdenum, chromium or cobalt may be employed as strongly hydrogenating catalysts. Other strongly hydrogenating catalysts, as for example, oxides of the metals of the 6th group of the periodic system may also be used. The pressures employed in this first stage are suitably from 50 to 300 atmospheres and the reaction conditions are usually such that from about 20 to 50 per cent or more of low boiling hydrocarbons are formed, while the remainder consists of a higher boiling oil rich in hydrogen. The first stage may, however, also be carried out under such conditions that the formation of low boiling constituents is suppressed to a large extent and mainly higher boiling substances rich in hydrogen are formed.

In the main treatment with hydrogenating gases the higher boiling oil rich in hydrogen is converted in an advantageous manner into low boiling hydrocarbons. This conversion is preferably carried out in the gas phase under a pressure of from about 30 to 300 atmospheres and more and at temperatures of from about 300 to 600° C.

The low boiling hydrocarbons obtained thereby constitute an excellent motor fuel with particularly good properties, such as high anti-knock value, and may, if desired, be admixed with the low boiling constituents formed in the preliminary treatment with hydrogenating gases.

The expression "treatment with hydrogenating gases of distillable carbonaceous materials" when employed in the present application is intended to comprise various reactions. Thus the expression includes the destructive hydrogenation of carbonaceous materials, such as coal of all varieties, including bituminous coal and lignite, other solid carbonaceous materials such as peat, shales and wood, mineral oils, tars and the products of distillation, conversion and extraction of such carbonaceous materials, and it is in destructive hydrogenation that the advantages obtained in accordance with the present invention are of particular importance. The said destructive hydrogenation may be used to produce hydrocarbons of all sorts, such as motor fuels, and in particular anti-knock motor fuels, solvent naphthas, middle oils, kerosene and lubricating oils. The said expression also includes the removal of non-hydrocarbon impurities such as substances containing sulphur or oxygen or nitrogen compounds by the action of hydrogen or gases containing or supplying hydrogen from crude carbonaceous materials, for example, the refining by treatment with hydrogen of crude benzol, of crude motor fuels or of lubricating oils. The said expression further includes the conversion of oxygen- or sulphur-containing organic compounds to produce the corresponding hydrocarbons or hydrogenated hydrocarbons or decomposition products thereof, for example, the conversion of phenols or cresols into the corresponding cyclic hydrocarbons or hydrogenation products thereof. The said expression also includes such reactions as the conversion of cresol to phenol and the conversion of phenol to cyclo-hexanol. The expression also includes the improvement of the properties of motor fuels with hydrogenating gases by an aromatizing or hydroforming treatment or of lubricating oils by hydroforming.

The said reactions with hydrogen or hydrogen containing gases are usually carried out at temperatures between 250° and 700° C. and as a rule between 380° and 550° C. With particularly active catalysts in accordance with the present invention temperatures of down to about 175° C. may be employed. The pressures employed are usually in excess of 20 atmospheres and as a rule preferably in excess of 50 atmospheres. In some reactions, however, atmospheric pressure or pressures slightly above atmospheric pressure for example, pressures of 10 atmospheres may be employed. For example, in the refining of crude benzol rather low pressures, for example, of the order of 40 atmospheres give good results. Generally, however, pressures of about 100, 200, 300, 500 and in some cases even 1000 atmospheres come into question.

The amount of hydrogen maintained in the reaction space and parts connected therewith, if any, varies greatly with the nature of the particular initial materials treated or according to the result in view. In general 400, 600, 1000, 2000, 4000, 8000 cubic metres or more of hydrogen measured under normal conditions of temperature and pressure, per ton of carbonaceous material treated may be used.

It is particularly advantageous to operate by continuously introducing fresh carbonaceous materials into the reaction vessel and to continuously remove products therefrom. Sufficiently converted reaction products may be removed behind any of the reaction vessels. Materials which have not been sufficiently reacted on may be recycled or treated in a further reaction vessel.

The carbonaceous materials may be treated in the reaction in the liquid, solid or gaseous phase as required.

The reaction is advantageously carried out with streaming hydrogenating gases.

The gases for use in the reaction may consist of hydrogen alone or of mixtures containing hydrogen, for example, a mixture of hydrogen with nitrogen or water gas or of hydrogen mixed with carbon dioxide, hydrogen sulphide, water vapor or methane or other hydrocarbons.

The reaction conditions in each specific case can readily be adjusted by those skilled in the art.

An apparatus suitable for carrying out the process according to the present invention is illustrated diagrammatically in elevation and partly in section in the accompanying drawing, though it should be understood that the invention is not limited to the catalytic treatment of combustible carbonaceous materials carried out in the specific form of apparatus illustrated.

The initial material and hydrogen is introduced into the apparatus by line 1 at the indicated point, compressed to the necessary pressure in compresser 2, passing to the heat regenerator 3 by way of line 4. From the heat regenerator 3 the feed mixture passes by way of line 5 and a heating coil 6, for raising the temperature of the mixture to that requisite for the reaction, into the high pressure reaction vessel 7. In the vessel 7 a porous siliceous catalyst 8, prepared according to the present invention, is stationarily arranged. The reaction product passes from the reaction vessel by means of line 9 and tubes 10 through the heat regenerator to a condenser 11, from whence it is introduced into a stripping vessel 12 after release of pressure as at 13. The liquid products are drawn off into a collecting vessel 14 through a line 15. Gaseous products are taken off through a line 16, and after purification, as in gas purifier 17, may either be drawn off by means of line 18 or introduced into the stream of fresh feed material, by means of line 19 opening into line 1.

We have also found that improved results are obtained in the production of liquid hydrocarbons from oxides of carbon and hydrogen and in cracking or reforming by working with catalysts, carriers or catalyst substances activated according to the present invention.

The following examples will further illustrate how the invention may be carried out in practice, but it should be understood, that the invention is not limited to the said examples. The percentages are by weight unless otherwise stated.

Example 1

Commercial Bavarian bleaching earth is treated at room temperature with hydrofluoric acid of 10 per cent strength for about 15 minutes while stirring, washed with water, dried and formed to pieces. These are stationarily arranged in a high pressure reaction vessel and the vapors of a gas oil obtained from German crude oil passed thereover together with hydrogen at 460° C. and under a pressure of 210 atmospheres. A product is obtained consisting for 40 per cent of benzine boiling up to 185° C.

If instead of bleaching earth treated with hydrofluoric acid the commercial bleaching earth is applied then from the same gas oil under otherwise identical conditions, a product is obtained with only 25 per cent of benzine boiling up to 185° C.

Example 2

A German bleaching earth pretreated with hydrofluoric acid in the manner described in Example 1, is impregnated with an aqueous solution containing 10 per cent of ammonium thiotungstate which contains an excess of ammonium sulphide, dried under exclusion of air and treated at 400° C. with hydrogen. The content of tungsten disulphide in the final catalyst amounts to 2 per cent. The catalyst, after having been pressed to suitably shaped pieces, is placed stationarily in a high pressure vessel and the vapors of a middle oil which has been obtained by destructive hydrogenation of brown coal from central Germany passed together with hydrogen under a pressure of 200 atmospheres thereover at 425° C. From the vapors leaving the reaction vessel a product is condensed by cooling which contains 60 per cent of constituents boiling below 185° C. and which are practically freed from phenols and unsaturated hydrocarbons. The oil which has not been converted into benzine is rich in hydrogen and may be applied as Diesel oil.

If a like bleaching earth which has not been treated with hydrofluoric acid is, however, applied, then a product is obtained under the same conditions which only contains 40 per cent of constituents boiling below 185° C.

Like good results are also obtained by passing a middle oil derived from the cracking of American petroleum over a catalyst consisting of Florida earth pretreated with hydrofluoric acid on to which molybdenum sulphide has been precipitated.

In place of this catalyst one containing a pretreated carrier of the sort employed according to the foregoing example and in addition iron sulphide and nickel sulphide (ratio of carrier to iron sulphide to nickel sulphide being 80:40:20) may be employed with advantage. The activity of this catalyst can be further increased by an addition of chromic oxide.

Example 3

Bleaching earth is heated while passing thereover a slow current of hydrogen fluoride at about 100° C. for about 4 hours, washed with water after having been cooled down, and dried. The thus pretreated bleaching earth is then soaked with a solution of ammonium tungstate in ammonium sulphide, dried and then treated with hydrogen containing hydrogen sulphide at 400° C. The product obtained which contains 10 per cent of tungsten sulphide, is formed to suitable pieces by pressing and stationarily arranged in a high pressure tube. Over this catalyst the vapors of a gas oil from German crude oil are passed together with hydrogen under a pressure of about 200 atmospheres at about 420° C. A product is obtained which contains 70 per cent of benzine has an octane number of 66. The middle oil, which has not been converted is rich in hydrogen and suitable for use as illuminating oil; it may also be returned to the reaction vessel for further conversion.

Example 4

Granulated active alumina (the granules having a diameter of from 3 to 4 millimeters) is treated with hydrofluoric acid of 10 per cent strength for a quarter of an hour, dried, then impregnated with a solution of ammonium thiotungstate and subsequently treated at 400° C. in a hydrogen current. The finished catalyst contains 90 parts of active alumina and 10 parts of tungsten disulphide. It is rigidly arranged in a high-pressure furnace and heated to 400° C. If the vapors of a gas oil obtained by the distillation of mineral oil are led over this catalyst together with hydrogen at a pressure of 200 atmospheres, a product is obtained which contains 40 per cent of benzine boiling up to 190° C.

If the alumina impregnated with tungsten disulphide be employed as a catalyst without having been pretreated with hydrofluoric acid, a product is obtained which contains only 12 per cent of benzine boiling up to 190° C.

Example 5

A catalyst prepared from molecular proportions of molybdic acid, zinc oxide and magnesium oxide is treated for a quarter of an hour with hyrofluoric acid of 15 per cent strength and dried. The catalyst thus obtained is rigidly arranged in a high-pressure vessel, and the vapors of a middle oil obtained from brown coal by destructive hydrogenation are led over this catalyst together with hydrogen at a pressure of 200 atmospheres and a temperature of 460° C. The product thus obtained consists of benzine to the extent of 60 per cent.

If the catalyst be not pretreated with hydrofluoric acid, a product is obtained which contains only 47 per cent of benzine.

Example 6

A middle oil which has been obtained by destructive hydrogenation of a German gas flame coal is passed together with hydrogen under a pressure of 200 atmospheres and at a temperature of 425° C. over pieces of tungsten sulphide. From the resulting product the benzine, which constitutes 45 per cent of the resulting oil, is separated in a column directly connected to the reaction chamber. The residual middle oil is then passed together with hydrogen at 415° C. over a catalyst contained in a second reaction chamber and which has been prepared as described in Example 1 and consisting of 90 parts of Bavarian bleaching earth "Terrana", which has been pretreated with hydrofluoric acid, and 10 parts of tungsten sulphide. The product thus obtained contains 70 per cent of benzine. The unconverted middle oil is again passed over the catalyst for further splitting. If the benzine obtained in the first and second stages be mixed, an excellent motor fuel is obtained containing 38 per cent of constituents boiling above 100° C. and having an octane number of 71.

Example 7

A middle oil having a boiling range of from

190° to 325° C. and obtained by destructive hydrogenation of brown coal from Central Germany is passed together with hydrogen under a pressure of 210 atmospheres and at a temperature of 430° C. over pieces of molybdenum disulphide. A product is obtained containing 50 per cent of constituents boiling up to 100° C. These are separated by distillation while the remainder is passed together with hydrogen at 405° C. and under a pressure of 210 atmospheres over a catalyst consisting of 65 parts of bleaching earth (which have been treated for about one quarter of an hour at room temperature with hydrofluoric acid of 10 per cent strength while stirring, washed with water and dried), 32 parts of iron sulphide and 3 parts of chromic oxide. The product thus obtained contains 60 per cent of benzine. If this be mixed with the benzine obtained in the first stage, a very good motor fuel is obtained having 37 per cent of constituents boiling up to 100° C. and an octane number of 66. The unconverted middle oil may be used as Diesel oil or may be again passed over the catalyst for further splitting.

What we claim is:

1. A process for the production of valuable hydrocarbon products by catalytic treatment of combustible carbonaceous materials with added hydrogenating gases at temperatures of 175 to 700° C. and under a pressure up to 1000 atmospheres which comprises employing as a catalyst a porous, siliceous material, the activity of which has been increased by treating it prior to its application with an agent selected from the group consisting of gaseous, liquid and solutions of fluorine, hydrogen fluoride and other compounds of fluorine capable of corroding siliceous material and washing said material in order to remove the fluorine-containing agent.

2. A process according to claim 1 in which the siliceous material is a bleaching earth.

3. A process according to claim 1 in which the porous siliceous material is provided with a catalytically active agent selected from the group consisting of metals and metal compounds incorporated therewith.

4. A process according to claim 1 in which the porous siliceous material is a bleaching earth provide with a catalytically active agent selected from the group consisting of metals and metal compounds incorporated therewith.

5. A process for the catalytic hydrogenation of combustible carbonaceous materials which comprises first leading the initial material with hydrogen over a strongly hydrogenating catalyst and then further subjecting the products thus formed to a heat treatment in the presence of a catalytic material of the nature described in claim 1.

6. As a catalytic material for the catalytic hydrogenation of combustible carbonaceous material a porous siliceous substance the activity of which has been increased by treating it prior to its application with an agent selected from the group consisting of fluorine, hydrogen fluoride and other compounds of fluorine capable of corroding siliceous material, and washing it in order to remove the fluorine agent the pretreatment with hydrogen fluoride being made by a method other than chemical precipitation.

MATHIAS PIER.
WALTER SIMON.
PAUL JACOB.